United States Patent [19]

Pritchard

[11] 4,100,471

[45] Jul. 11, 1978

[54] STEPPING MOTOR CONTROL CIRCUIT

[76] Inventor: Eric K. Pritchard, 1702 Plymouth Ct., Bowie, Md. 20716

[21] Appl. No.: 707,129

[22] Filed: Jul. 20, 1976

Related U.S. Application Data

[63] Continuation of Ser. No. 501,891, Aug. 30, 1974, abandoned.

[51] Int. Cl.² .............................................. G05B 19/40
[52] U.S. Cl. ..................................... 318/685; 318/138
[58] Field of Search ................. 318/696, 685, 138, 254

[56] References Cited

U.S. PATENT DOCUMENTS

| | | | |
|---|---|---|---|
| 3,750,000 | 7/1973 | Bruckner et al. | 318/696 |
| 3,777,246 | 12/1973 | Barnes | 318/696 |
| 3,885,210 | 5/1975 | Burnett | 318/696 |
| 3,890,554 | 6/1975 | Yoshitake et al. | 318/696 |
| 4,020,485 | 4/1977 | Busby | 340/347 DA |

*Primary Examiner*—Robert K. Schaefer
*Assistant Examiner*—John J. Feldhaus
*Attorney, Agent, or Firm*—Leitner, Palan, Martin & Bernstein

[57] ABSTRACT

A control circuit for a stepping motor is provided which rotates the motor armature in such a manner as to minimize motor resonances while not appreciably reducing the motor torque at high speeds. The motor inherently possesses a non-linear transfer function of current to flux and the circuit includes means responsive to an input signal for developing a position command signal which is a sinusoidal waveform modified by the inverse of the motor transfer function. Further means are provided responsive to the position command signal for developing an energization signal for the stepping motor including means responsive to the position command signal and motor field current for terminating a motor energization cycle.

13 Claims, 7 Drawing Figures

STEPPING MOTOR CONTROL CIRCUIT

This is a continuation of application Ser. No. 501,891, filed Aug. 30, 1974, now abandoned.

BACKGROUND OF THE INVENTION

The present invention relates generally to stepping motors and more particularly to circuits for controlling the energization of stepping motors.

In stepping motors, it is common to energize the field windings of a motor in a sequential step-by-step manner which will cause the armature of the motor to rotate in a corresponding step-by-step manner. The degree of mechanical rotation of the rotor is dependent on the number of field windings, the location of the field windings with respect to the rotor, and the manner in which the field windings are energized. The prior art is replete with stepping motor control circuits which rotate the motor armature in full steps. While such circuits have been fairly effective in advancing the motor armature at high speeds, at low speeds the motor armatures have been subject to resonance problems which cause the armature to resonate or oscillate or exhibit radical variances in velocity.

A number of circuits designed to drive a stepping motor in half steps are known in the art as in the fact that a motor driven in half steps does not resonate as severely as a motor driven in full steps. To help explain this phenomenon, consider that stepping motor low frequency resonance closely approximates a linear underdamped spring-mass system. In such a system halving the input command halves the output displacement. However, motor torque is not linear with respect to displacement. This is because damping is a combination of windage and friction, and while the windage in a stepping motor is linear, the friction is not. Thus, when operating a stepping motor in a continuous fashion, if the minimum potential energy due to the motor torque over a step is less than the energy dissipated by the friction torque, the motor will behave in an overdamped manner. The motor torque is proportional to the sine of the displacement, and as a result the minimum potential energy for a step decreases with the step size. The potential energy, E, is equal to:

$$E = K \int_B^{B+S} \sin(\theta)\, d\theta = K[\cos(B) - \cos(B+S)]$$

where $K$ is the motor holding torque, $S$ is the step size and where a full step $S$ equals $\pi/2$, and $B$ is the angular displacement remaining at the end of a step. The minimum potential energy occurs when $B = 0$.

U.S. Pat. No. 3,445,741 discloses a technique for producing fractional steps to control a stepping motor. This system requires that for producing N sub-steps in a four phase stepping motor, 2N output transistors and associated logic circuitry must be utilized. Thus, in order to produce very fine steps this circuit becomes quite complex.

SUMMARY OF THE INVENTION

The present invention overcomes the aforementioned difficulties by providing a control circuit for a stepping motor which rotates the motor armature in such a manner as to minimize motor resonances while not appreciably reducing the motor torque at high speeds. The motor inherently possesses a non-linear transfer function of flux and the circuit includes means responsive to an input signal for developing a position command signal which is a sinusoidal waveform modified by the inverse of the motor transfer function. Further means are provided responsive to the position command signal for developing an energization signal for the stepping motor including means responsive to the position command signal and motor field current for terminating a motor energization cycle.

An object of the present invention is the provision of a stepping motor control circuit which will minimize motor resonances while not appreciably reducing motor torque at high speeds.

Another object of the present invention is the provision of a stepping motor control circuit which is capable of driving the motor armature in fine steps and in which the complexity of the output stage is independent of the number of steps.

A further object of the present invention is the provision of a stepping motor control circuit which operates in a sub-stepping mode at low frequencies and a full stepping mode at high frequencies.

Still another object of the present invention is the provision of a stepping motor control circuit which is capable of responding to either analog or digital input signals.

A still further object of the present invention is the provision of a stepping motor control circuit which is capable of terminating a motor energization cycle.

Other objects, advantages and novel features of the present invention will become apparent from the following detailed description of the invention when considered in conjunction with the accompanying drawings.

DESCRIPTION OF THE PREFERRED EMBODIMENTS

Figure 1:
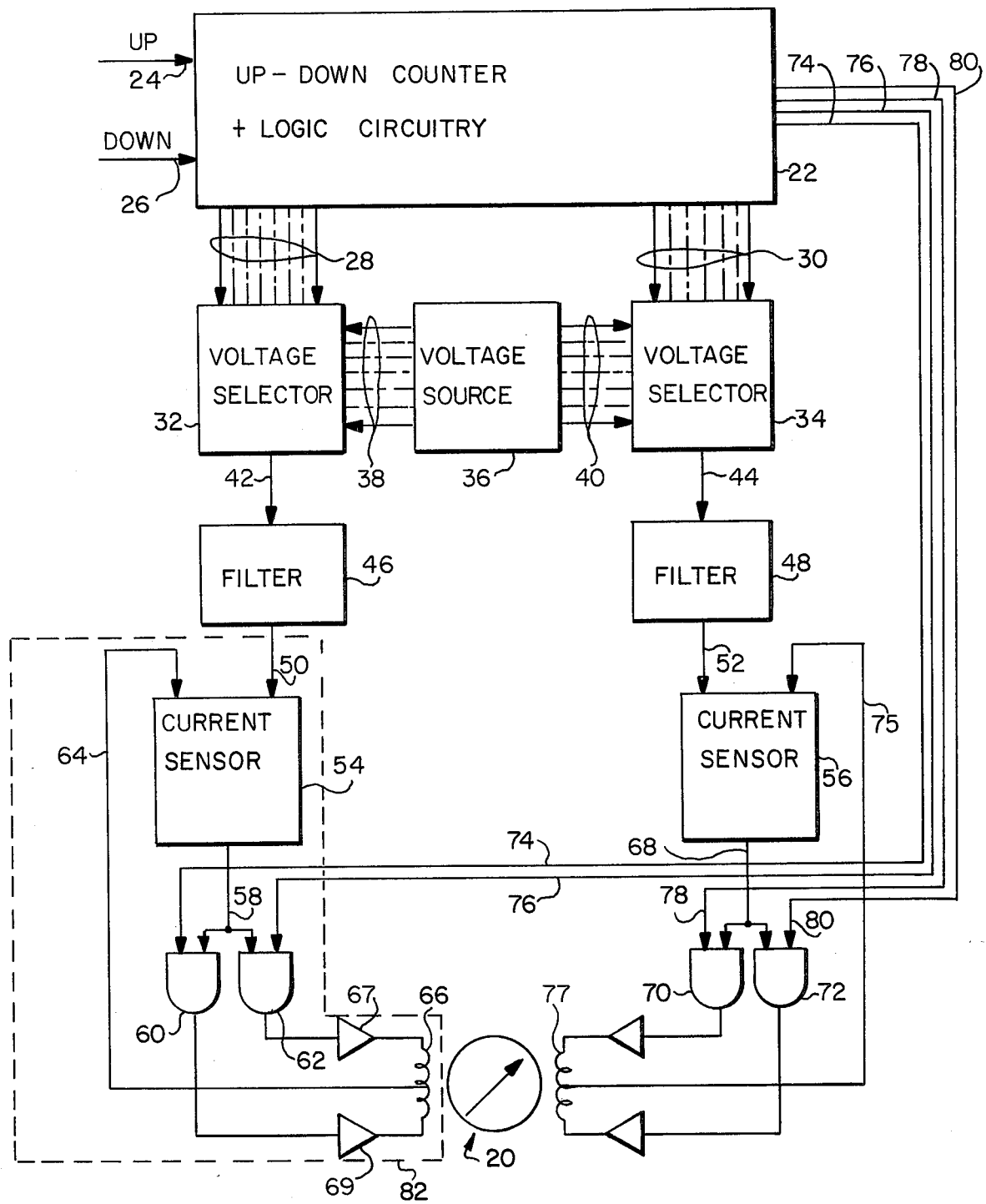
FIG. 1 shows in block diagram form an embodiment of the stepping motor control circuit of the present invention.

With reference to FIGS. 1 through 4, a first embodiment of the stepping motor control circuit of the present invention will now be described. FIG. 1 shows in block diagram form a control circuit for a stepping motor 20 which is disclosed for purposes of illustration as a four phase stepping motor. It is to be understood, however, that it is well within the skill of one having ordinary skill in the motor control art to adapt the circuit of the present invention to any stepping motor. The motor 20 inherently possesses non-linear magnetic characteristics or, put mathematically, the motor 20 inherently possesses a non-linear transfer function of current to flux.

Referring to FIG. 1 an up-down counter 22 receives digital up commands 24 and down commands 26 indicative of the desired direction and rate of motor travel. The counter 22 keeps a count of the difference of the number of up commands 24 and down commands 26. There are several up-down counting techniques known in the art for accomplishing such a purpose. The present invention preferably employs a six stage counter. The counter 22 and its associated logic circuitry provides for each counter a pair of digital outputs 28 and 30 respectively. The digital signals 28 are fed to a voltage selector 32 and the digital signals 30 are fed to a voltage selector 34. A discrete voltage source 36 provides a plurality of discrete direct voltage signals. In a preferred embodiment the discrete voltage source 36 is a voltage divider as is shown more clearly in FIG. 3. Any other means for providing a plurality of discrete direct voltage signals could be utilized without departing from the scope of the present invention. For example, a "read only" memory coupled to a digital to analog converter could provide such signals. The voltage source 36 is connected to voltage selectors 32 and 34 by cables 38 and 40, respectively. The voltage selectors 32 and 34 select one of the voltages available on the cables 38 and 40 in accordance with the instructions delivered to the voltage selectors 32 and 34 by the digital signals 28 and 30 respectively. The outputs of the voltage selectors 32 and 34 are cycled from a minimum to a maximum and back to the minimum twice in a single cycle of the counter 22. Thus, the outputs 42 and 44 of the voltage selectors 32 and 34 are a step wise approximation of the absolute value of a sine wave. The outputs 42 and 44 are similar but shifted in phase. In the case of the four phase motor illustrated in FIG. 1 the phase shift is 90°. Thus, one signal is a distorted absolute value sine wave and the other signal is a distorted absolute value cosine wave. The distortion is intentionally designed into the sine and cosine waves by means of the voltage source 36 to compensate for the non-linearities inherent in the magentic characteristics of the motor material.

The output command signals 42 and 44 from the voltage selectors 32 and 34 respectively, are delivered to a pair of identical filters 46 and 48. The filters 46 and 48 are preferably a simple RC filter which reduces the amplitude of the A.C. component of the command signals 42 and 44 and leaves the D.C. component at about two-thirds of the peak command level. For most purposes this has been found to be a good compromise between lack of high frequency resonance and good high speed response. However, in specific instances, motor loading may require different filter characteristics, both linear and non-linear. Thus, for example, by simply paralleling the resistor in the filter 11 and 12 with a diode, one obtains better high frequency response at the expense of increasing high frequency resonance.

Thus, outputs 50 and 52 from the filters 46 and 48 respectively, are position command signals which are absolute value sinusoidal waveforms modified by the inverse of the motor transfer function. The outputs 50 and 52 are fed to a pair of identical current sensors 54 and 56 respectively. The operation of the current sensors 54 and 56 and their associated motor energization circuitry are described in detail in FIG. 2. However, the function of the current sensors 54 and 56 can be described in general terms in connection with the block diagram showing of FIG. 1. The current sensor 54 delivers its output 58 to a pair of AND gates 60 and 62. The current sensor 54 receives a second input 64 indicative of the motor current present in field winding 66. The current sensor 54 compares the motor current with the output 50 of filter 11. If the motor current is too high, the output 58 becomes a logical zero for a short time. This permits either gate 60 or 62, as selected by the counter 22, to turn off. If at the end of this time, the motor current is still too high, the output 58 remains a logical zero. When the motor current falls far enough, the output 58 becomes a logical 1 and one of the gates 60 or 62, is turned on. Thus, an energization signal will be delivered through amplifiers 67 and 69 to the field winding 66. In a similar manner, current sensor 56 produces an output 68 which controls the conductivity of gates 70 and 72 by comparing the filter output 52 with a signal 75 indicative of the current in field winding 77.

The counter 22 delivers signals along lines 74, 76, 78, and 80, to gates 60, 62, 70 and 72 respectively in a manner well known in the art for controlling a full stepping four phase stepping motor. These signals are merely four square waves separated in phase by 90°.

The motor energization circuitry will now be described in detail with reference to FIG. 2. The circuity shown in FIG. 2 has already been represented in block diagram form as the excitation circuitry 82 for motor winding 66. The excitation circuitry 82 is responsive to the position comannd signals 50 and 52 and develops an energization signal for the stepping motor 20. Since the excitation circuitry for motor winding 77 is identical to that of motor winding 66, the excitation circuitry for motor winding 66 only will be described in detail. The filter output 50 is connected to a unitary gain amplifier 84 which acts as a buffer. The output from amplifier 84 is connected directly to the positive terminal 86 of a comparator 88 and also to a unitary gain inverting amplifier 90. The output from amplifier 90 is connected to the negative terminal 92 of a comparator 94. The output from the comparator 94 is fed to a one shot multivibrator 96 and the outputs from multivibrator 96 and comparator 88 are each delivered to AND gates 60 and 62. AND gate 62 also receives command signal 74 from counter 22, and AND gate 62 also receives command signal 76 from counter 22. As was mentioned before, the command signals 74 and 76 are square waves separated in phase by 180°. The outputs of the gates 60 and 62 are connected to amplifiers 98 and 100 respectively whose outputs in turn are connected to the base terminals of transistors 102 and 104 respectively. The transistors 102 and 104 have diodes 106 and 108, respectively connected across their emitter and collector terminals. In addition, the emitter terminals of transistors 102 and 104 and the cathode terminals of diodes 106 and 108 are connected to a negative voltage terminal 110. Terminal 110 is connected to a negative D.C. voltage supply which, in a preferred embodiment, is a negative 30 volts. The value of the negative D.C. voltage supply is dependent on the desired high frequency response of the control circuit. The collector terminals of transistors 102 and 104 are connected to opposite ends of the motor winding 66. As was mentioned before, a current sense line 64 is connected to a center tap 112 on motor winding 66. The current sense line 64 is connected at its other end to a hysteresis network including resistors 114, 116, 118 and 120; diode 122; ground terminal 124; and positive voltage terminal 126. The positive voltage terminal is preferably connected to a positive 15 volt D.C. supply. The output of the hysteresis network is fed to the positive terminal 128 of comparator 94 and the negative terminal 130 of comparator 88.

The motor energization circuit operates as follows: Since the command signals 74 and 76 are 180° out of phase, when one signal is a logical one, the other signal is always a logical zero. Consequently, at any given point in time, only one of the gates 60 and 62 may output a logical one, and only one of the driver transistors 102 and 104 may be drawing current. Assuming that a signal 74 is a logical one and that signal 76 is a logical zero, then the current through transistor 102 and subsequently the current sense line 64 increases. Since the voltage at terminal 110 is negative, the voltage on resistor 114 drops drastically. The components in the hysteresis circuit set the hystersis by adding a small voltage onto the voltage across the resistor 114. When this total voltage at comparator terminal 128 falls below the output of the unity gain inverting amplifier 90 delivered to a comparator terminal 92, comparator 94 causes the one shot multivibrator 96 to cycle. The multivibrator 96 outputs a logical zero for a short period of time, causing gate 60 to output a logical zero and ultimately causing the level shifting amplifier 98 to turn off transistor 102. When the transistor 102 turns off, the voltage across diode 106 increases rapidly. Since the motor winding 66 acts like a transformer, the diode 108 begins to conduct, thus reversing the current flow in the current sense line 64. Assuming a lossless situation, the current in line 64 will retain the same value as in the earlier cycle but will simply switch polarity. Thus, the current in the motor winding 66 can now decrease, thereby lowering the voltage of resistor 114 and the voltage on the negative input terminal 130 of comparator 88. When the current in line 64 drops sufficiently, the output of comparator 88 becomes a logical one. If the one shot multivibrator 96 has cycled, the gate 60 forces amplifier 98 to turn on transistor 102.

The use of comparator 88 is one of the particular features of the present invention. Comparator 88 allows the current in motor winding 66 to drop rapidly in response to a rapidly dropping position command signal 50. If comparator 88 were not used, the circuit would have no mechanism for determining if more current should be delivered to winding 66 or if the supply of current should be terminated. The circuit would simply turn on one of the driving transistors 102 or 104, thereby increasing the current in winding 66, until the comparator 94 could again start a cycle in the one shot multivibrator 96. Such an increase in the delivery of current to winding 66 at a time when the current in winding 66 should be falling causes poor high frequency response. Thus, the inclusion of comparator 88 in the motor excitation circuit provides a means responsive to the position command signal 50 and the control signal from the current sense line 64 for terminating a motor energization cycle. As soon as the value of the position command signal sensed at terminal 86 falls below the value of the control signal sensed at terminal 130 the comparator 88 outputs a logical zero thus terminating a motor energization cycle.

When signal 76 is a logical one and signal 74 a logical zero, the circuit will operate in a similar manner this time utilizing gate 62, amplifier 100, and transistor 104. While the circuit depicted in FIG. 2 illustrates the use of a push-pull style of driving the motor winding 66, one skilled in the art could easily modify this circuit to drive single ended windings utilizing either bridge or bipolar techniques. Furthermore, while the circuit depicted in FIG. 2 will not chop on current levels very close to zero, a simple alteration of the gates 60 and 62 could solve this possible shortcoming.

Figure 3:
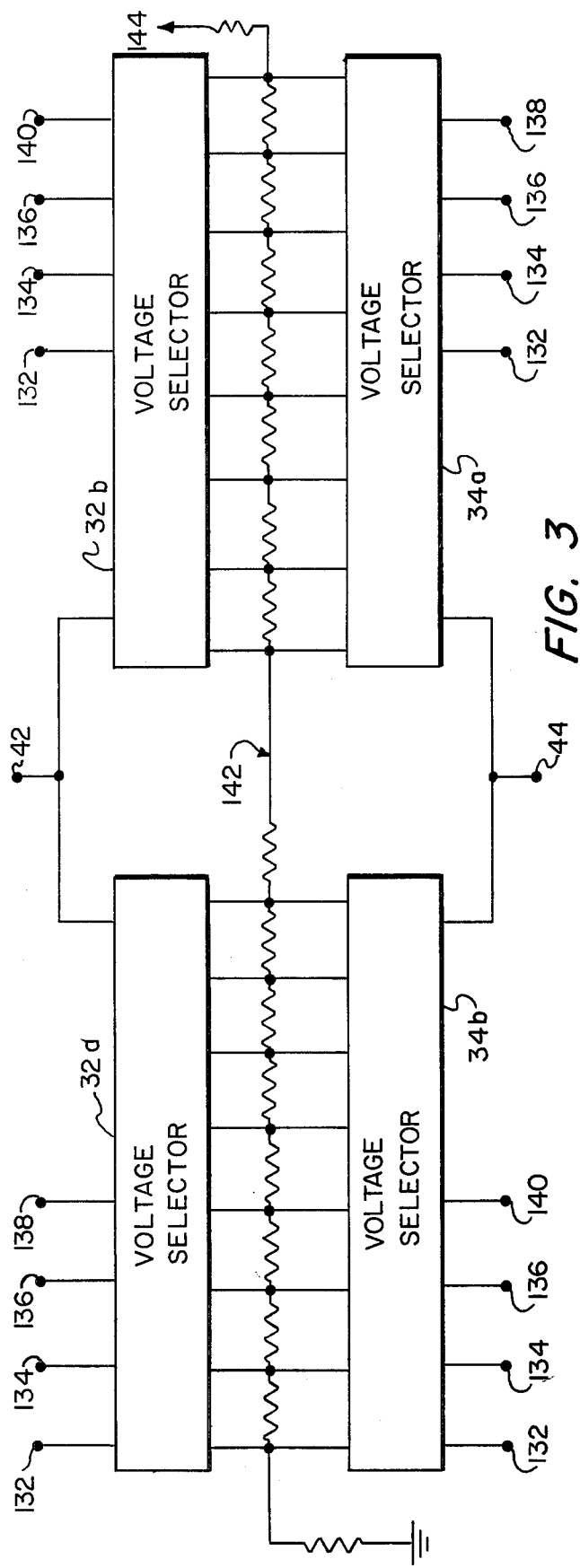
FIG. 3 shows in detail a voltage divider suitable for use in the embodiment shown in FIG. 1.

FIG. 3 shows a detailed diagram of a preferred embodiment of the voltage source 36. The voltage selectors 32a, 32b, 34a and 34b receive input signals from the counter 22 output logic at terminals 132, 134, 136, 138 and 140. Each of the voltage selectors 32a, 32b, 34a, and 34b, is preferably an eight channel multiplexer of the type manufactured by the Radio Corporation of America, Model No. CD4051AE. A voltage divider 142 is connected to a source of D.C. potential 144. The potential 144 is preferably 5 volts D.C. The number of resistors in the voltage divider 142 and the particular resistance values are matters of empirical design within the skill of one having ordinary skill in the art. In practice, a voltage divider will be designed for each type of stepping motor to be controlled. The voltage selectors 32a, 32b, 34a and 34b are connected across the individual resistors of the voltage divider 142. In response to signals from the counter logic circuitry 22 the voltage selectors will select a particular voltage and output that voltage at terminals 42 and 44. While the design of a particular voltage selection circuit is a relatively simple matter for one skilled in the art, the concept of incorporating such a voltage selection circuit in a control circuit for a stepping motor goes to the very heart of the present invention. This technique enables the complexity of the excitation circuit to be unaffected by the number of sub-steps desired for a particular control scheme. As was mentioned before, the voltage selector outputs 42 and 44 are step wise approximations of the absolute value of a sine wave. Since the stepping motor 20 produces an internal flux which varies non-linearly with respect to current, a requisite to the non-resonant operation of the motor 20 is that the absolute value sine wave be distorted to make all the steps the same size. Another way of describing this phenomenon is that the motor 20 transfer function of current to flux is non-linear. Thus the levels of the voltage divider 142 must form a step wise approximation to the desired distorted absolute value sine wave; or in other words must produce a signal which is a result of the inverse of the above mentioned transfer function operating on a sine wave. One of the distinct advantages of the present invention is that by empirically designing the voltage divider 142 an inverse transfer function can be developed which compensates for not only theoretical motor non-linearities but also all practical motor non-linearities. In the circuit of the present invention, it is possible to tune out resonance by merely adjusting the step sizes. This may be easily accomplished by merely adjusting the resistance values until the desired steps are achieved.

Normal operational considerations, i.e., the requirement to energize the motor in small, equal-sized steps for smooth, continuous rotation, demand the development of a position command signal which is a sinusoid distorted by the inverse of the current to flux transfer function, as discussed above. However, other operational considerations may dictate that the position command signals be non-sinusoidal and distorted in a variety of other ways. The important thing to note here is that the voltage source 36 is capable of producing a variety of complex wave forms. This is possible through the proper selection of resistors in the voltage divider 142 and the proper selection of the order in which different voltages are selected by the voltage selectors 32 and 34.

It should be further noted that although the position command signals are illustrated as single wave forms 178 and 180, it is within the skill of one having ordinary skill in the motor control art to design a position command signal utilizing a plurality of wave forms.

Figure 4:
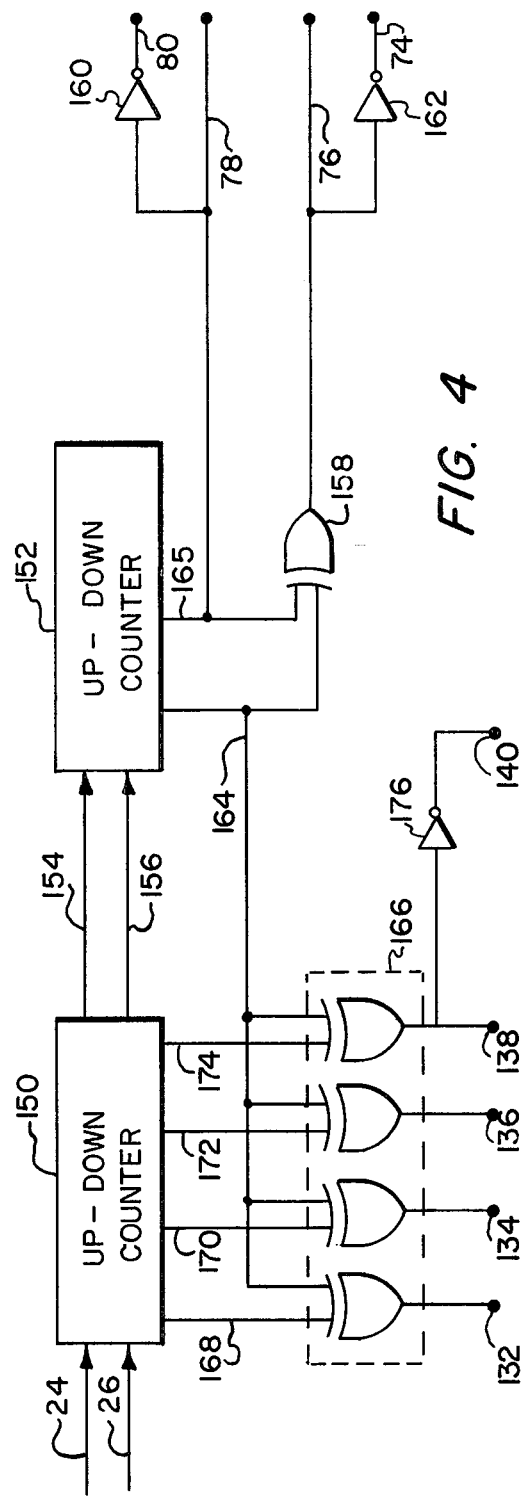
FIG. 4 shows in detail the counter and logic circuitry of the circuit shown in FIG. 1.

FIG. 4 is a detailed diagram of the counter and logic circuitry employed in a preferred embodiment of the present invention. An up-down counter 150 is driven by up and down commands 24 and 26 respectively. The counter 150 divides a full step taken by the stepping motor 20 into a number of sub-steps. The particular number of sub-steps per full step is not critical to the successful operation of the control circuit of the present invention as long as the minimum sub-step potential energy is less than the energy required to move the stepping motor 20 armature and all that is connected to the armature. In the preferred embodiment shown, the number of sub-steps per full step is sixteen. The counter 150 is a four stage binary counter, which drives a second up-down counter 152 by means of signals 154 and 156. In this embodiment, the counter 152 has four stages but utilizes only two. Thus, effectively the counter 152 has four states, corresponding to the use of a four phase stepping motor. Counter 152 in connection with exclusive OR gate 158 and inverters 160 and 162 provides the gating command signals 74, 76, 78 and 80. In addition, output signal 164 from counter 152 controls exclusive OR gate array 166. The counter 150 feeds outputs 168, 170, 172 and 174 to the OR gate array 166. If signal 164 is a logical zero, the inputs 168, 170, 172 and 174 are not inverted. On the other hand, if signal 164 is a logical one, the inputs 168, 170, 172 and 174 are inverted, thereby creating outputs 132, 134, 136 and 138. These outputs, when taken as a binary number, rise from zero to 15 in 16 intervals and then drop from 15 to zero in another 16 intervals. A fifth output signal 140 is created by simply feeding signal 138 through an inverter 176.

Figure 5:
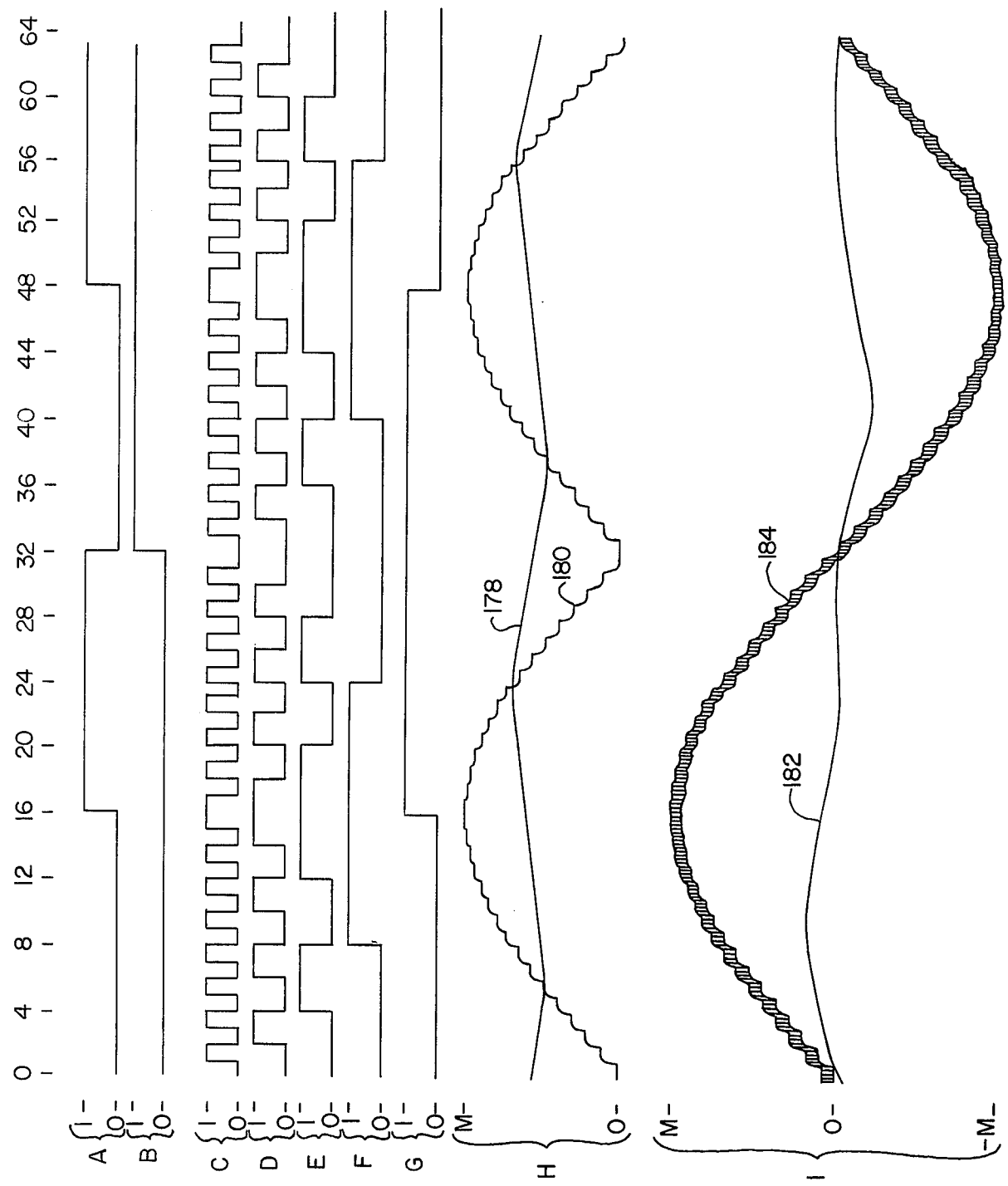
FIG. 5 shows waveforms of signals at various locations in the circuit of FIG. 1.

FIG. 5 depicts some of the waveforms of the signals developed in the motor control circuit of the present invention. FIGS. 5A and 5B show the outputs 164 and 165 from counter 152. FIG. 5C shows the waveform resulting from the exclusive OR operation of output 168 from counter 150 and output 164 from counter 152, thus producing output 132. FIGS. 5D, 5E, 5F and 5G show the results of similar exclusive OR operations to produce output waveforms at 134, 136, 138 and 76 respectively. The waveforms shown in FIGS. 5C, 5D, 5E and 5F essentially form the address for the voltage selectors 32 and 34. It should be noted that the binary values go from zero to 15 and then back to zero and that this cycle occurs twice in one cycle of the counter 152. The waveforms 178 and 180 in FIG. 5H show the output signal 50 of filter 46 which is the position command signal. Waveform 180 is the filter output 50 at low frequency operations and waveform 178 is the filter output 50 at high frequency operations. The output signal 52 from filter 48 is similar to waveforms 178 and 180 but is shifted in time by 16 steps.

Waveforms 182 and 184 shown in FIG. 5I depict the net current in the motor winding 66. Waveform 184 depicts the motor current at low frequency operations and waveform 182 depicts the motor current at high frequency operations. The envelope in waveform 184 is caused by the voltage chopping of the current sensor 54. It is interesting to note that at high speed operation, waveform 182 illustrates that no chopping action is taken place. This waveform is formed by the signal shown in FIG. 5B and the available drive voltage.

In order to get an idea of what the mid-frequency operation would be, one can merely interpolate between the two curves 182 and 184. No chopping occurs when the current is required to change at a rate higher than is possible with the available drive voltage. Once the motor current catches up to the required current level, the chopping action begins.

Figure 6:
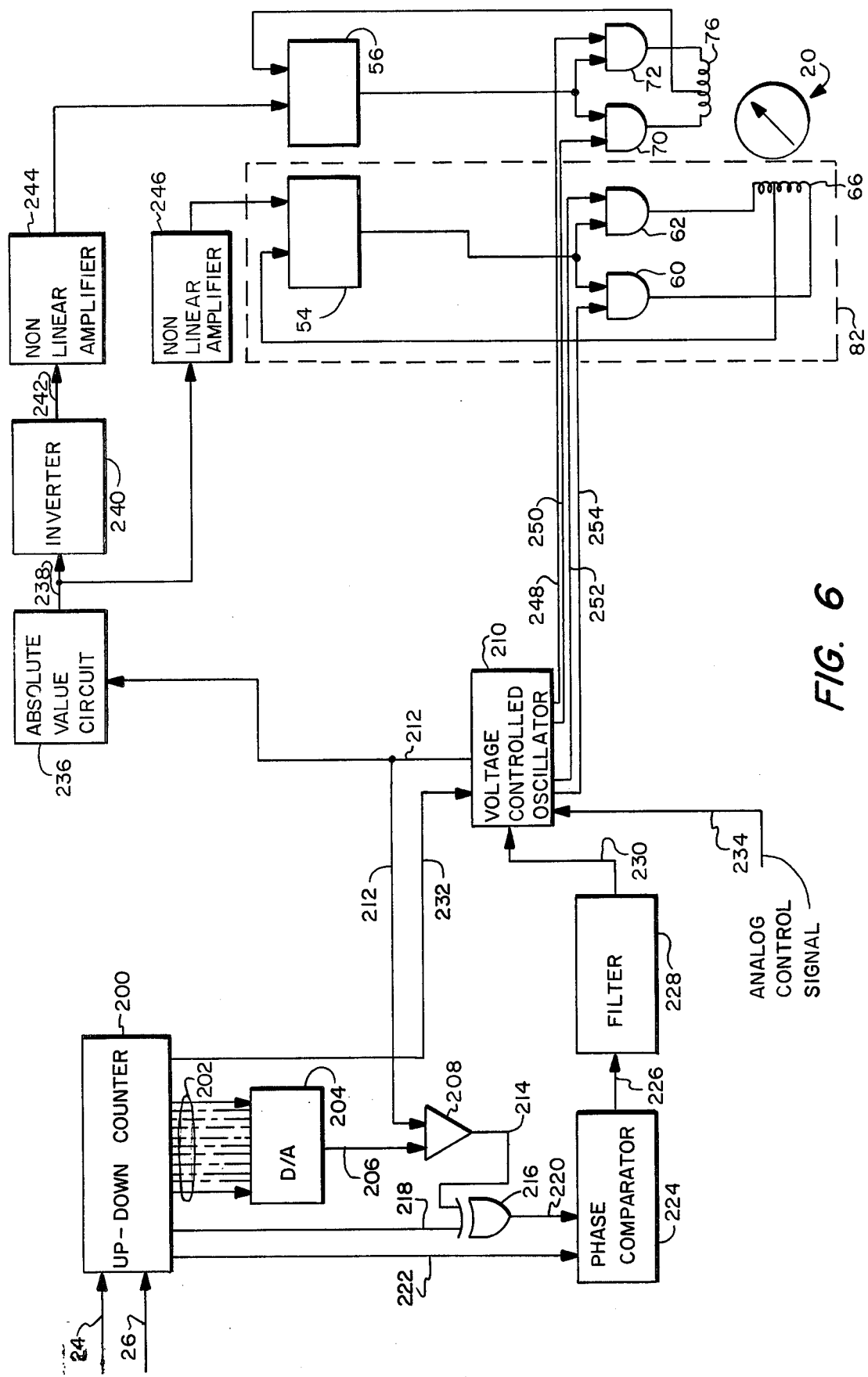
FIG. 6 shows in block diagram form a second embodiment of the stepping motor control circuit of the present invention.
Figure 7:
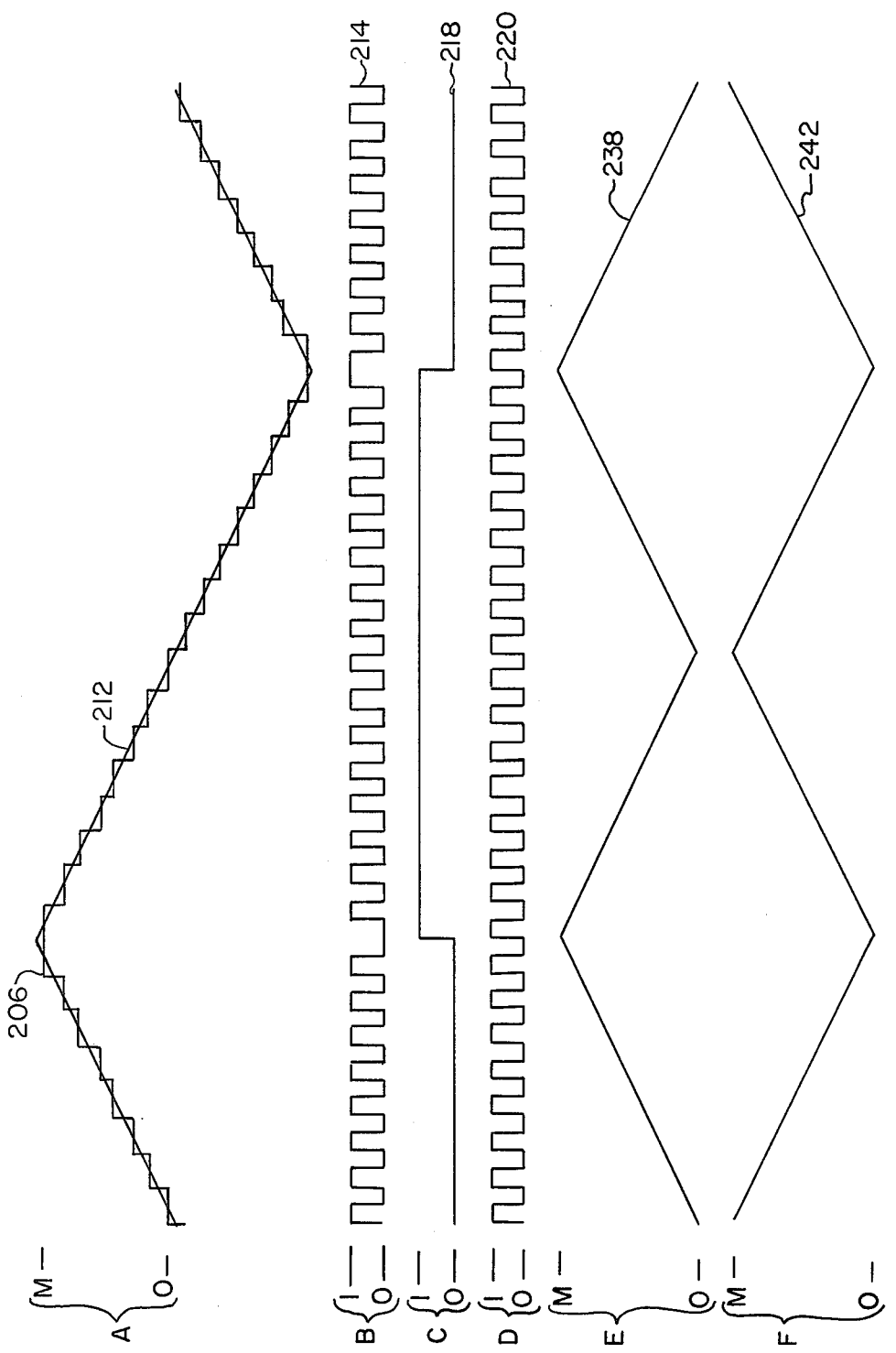
FIG. 7 shows waveforms of signals at various locations in the circuit of the embodiment shown in FIG. 6.

A second embodiment of the stepping motor control circuit of the present invention will now be described with reference to FIGS. 6 and 7. In the description of FIGS. 6 and 7, like numerals have been utilized to identify components which are identical to those described in FIGS. 1 and 2. Thus, FIG. 6 shows in block diagram form a control circuit for a stepping motor 20. An up-down counter 200 receives digital up commands 24 and down commands 26. From stages two and higher within the counter 200 a digital signal 202 is created and delivered to a digital to analog converter 204. The digital to analog converter 204 delivers an output signal 206 to one terminal of a comparator 208. A voltage controlled oscillator 210 produces an output signal 212 which is delivered to a second terminal of the comparator 208. The comparator 208 compares signals 206 and 212, as is illustrated in FIG. 7A, and produces an output signal 214, which is shown in FIG. 7B. The comparator output signal 214 is delivered to one terminal of an exclusive OR gate 216. A second terminal of exclusive OR gate 216 is connected to counter 200 and receives signal 218, illustrated in FIG. 7C. The comparator output signal 214 is then selectively negated in exclusive OR gate 216 by signal 218 producing output waveform 220, shown in FIG. 7D. The first state of counter 200 produces an output signal 222 which along with gate output 220, is connected to a phase comparator 224. The phase comparator 224 compares signals 220 and 222 and produces an output signal 226 which is integrated by a filter 228. The output 230 of the filter 228 controls the frequency of the voltage controlled oscillator 210. The portion of the circuit shown in FIG. 6, and thus far described is well known in the art of phase locked oscillators, and forms no part of the present invention. If the signal 212 becomes too low in frequency when compared to the signal 206, the phase comparator 224 will cause the filter output 230 to rise thus causing the voltage controlled oscillator 210 to increase the frequency of output 212. Similarly, if signal 212 is too high in frequency when compared to signal 206 the voltage controlled oscillator 210 frequency will be lowered by the phase comparator 224 and filter 228. To aid in obtaining phase lock the counter 200 may produce signals forcing the voltage controlled oscillator 210 to a state corresponding to a state within the counter 200. In cases where analog control is preferred, counter 200, digital to analog converter 204, comparator 208, exclusive OR gate 216, phase comparator 224, and filter 228, may be elminated and replaced by an analog control signal 234.

The output signal 212 from voltage controlled oscillator 210 is also connected to an absolute value circuit 236, which produces an output signal 238 as shown in FIG. 7E. Such absolute value circuits are well known in the art. Signal 238 is connected to amplifier 240 which inverts and shifts the level of signal 238 to produce output waveform 242, shown in FIG. 7F. The circuit has thus far produced two signals 238 and 242 which are related in phase in a manner similar to the absolute value of a sine wave and the absolute value of a co-sine wave.

Signals 238 and 242 are then connected to non-linear transfer function amplifiers 244 and 246 respectively. Amplifiers 244 and 246 perform the same function as the voltage selectors 32 and 34 and the voltage source 36 of the embodiment shown in FIG. 1. Since amplifiers 244 and 246 may be designed empirically, the desired inverse transfer function may be obtained. The design of such non-linear amplifiers is well known and is taught in Operation Amplifiers Design and Application — Toby, Grame and Huelsman, editors — McGraw Hill, Chapter 7, Section 3, pages 251–258. Amplifiers 244 and 246 produce the distorted sine and cosine waveforms as position command signal which are required to move the motor 20 without speed variation for constant frequency input, thus, the transfer function amplifiers 244 and 246 must have a transfer function which is similar to that of the discrete voltage circuit disclosed in FIGS. 1 and 3.

The remainder of the circuit is the same as that shown in FIG. 1 with the exception that signals 248, 250, 252 and 254 are delivered to AND gates 60, 62, 70 and 72 from the voltage controlled oscillator 210. Thus, the circuit shown in FIG. 6 operates in a manner similar to the circuit shown in FIG. 1 and has the additional capability of responding to an analog control signal.

Thus, a new and improved stepping motor control circuit has been provided which both minimizes motor resonances and maintains the complexity of the motor excitation circuit independent of the number of steps desired to drive the motor armature.

Although the invention has been described and illustrated in detail, it is to be clearly understood that the same is by way of illustration and example only and is not to be taken by way of limitation, the spirit and scope of this invention being limited only to the terms of the appended claims.

What is claimed is:

1. A control circuit for a stepping motor having a non-linear transfer function of current to flux, comprising:
   (a) means for receiving an input signal indicative of the desired direction and rate of motor travel,
   (b) means responsive to said input signal for developing a position command signal which is a sinusoidal wave form modified by the inverse of said transfer function, including means for simultaneously developing a plurality of discrete direct voltage signals and means responsive to said input signal for selecting a particular one of said discrete direct voltage signals and developing a command signal therefrom, and
   (c) means responsive to said position command signal for developing an energization signal for said stepping motor.

2. A control circuit for a stepping motor as set forth in claim 1 wherein said means for developing a plurality of direct voltage signals includes a direct voltage source and a voltage divider having a plurality of discrete positions connected thereacross and wherein said means for selecting a particular one of said direct voltage signals comprises a plurality of switches connected to each of said portions of said voltage divider and means for controlling the state of said switches in response to said input signal.

3. A control circuit for a stepping motor as set forth in claim 1 wherein said means for developing a plurality of direct voltage signals includes a filter circuit.

4. A control circuit for a stepping motor as set forth in claim 1 wherein said motor includes a field winding and wherein said means for developing said energization signal comprises:
   means for sensing the current in said field winding and developing a control signal indicative thereof, and means responsive to said position command signal and said control signal for terminating a motor energization cycle.

5. A control circuit for a stepping motor as set forth in claim 4 wherein said means for terminating a motor energization cycle includes a comparator adapted to receive said position command signal and said control signal.

6. A control circuit for a stepping motor as set forth in claim 5 wherein said means for developing said energization signal further comprises a second comparator adapted to receive the inverse of said position command signal and said control signal.

7. A control circuit for a stepping motor including a field winding comprising:
   (a) means for receiving an input signal indicative of the desired direction and rate of motor travel,
   (b) means responsive to said input signal for developing an analog position command signal whose amplitude defines the electrical position of the motor, said means for developing an analog position command signal includes a non-linear amplifier means and a voltage controlled oscillator for receiving said input signal and producing an output signal which is delivered to said non-linear amplifier means, and
   (c) means responsive to said position command signal for developing an energization signal for said stepping motor.

8. A control circuit for a stepping motor as set forth in claim 7, wherein said means for developing an energization signal includes:
   (1) means for sensing the current in said field winding and developing a control signal indicative thereof, and
   (2) means responsive to said position command signal and said control signal for terminating a motor energization cycle.

9. A control circuit for a stepping motor as set forth in claim 8, wherein said means for terminating a motor energization cycle includes a comparator adapted to receive said analog position command signal and said control signal.

10. A control circuit for a stepping motor as set forth in claim 9, wherein said means for developing said energization signal further comprises a second comparator adapted to receive the inverse of said position command signal and said control signal.

11. A control circuit for a stepping motor as set forth in claim 1 wherein said means for developing a position command signal includes means for also modifying said sinusoidal wave form by the inverse of other non-linear characteristics of said stepping motor.

12. A control circuit for a stepping motor having a non-linear transfer function of current to flux including a field winding comprising:
   (a) means for receiving an input signal indicative of the desired direction and rate of motor travel,
   (b) means responsive to said input signal for developing a position command signal, which is sinusoidal waveform modified by the inverse of said transfer function, and (c) means responsive to said position command signal for developing an energization signal for said stepping motor including:
   (1) means for sensing the current in said field winding and developing a control signal indicative thereof,
   (2) means for developing a hysterisis signal, and
   (3) comparator means providing first and second comparisons for beginning and terminating a motor energization cycle, said first comparison being between said position command signal and the sum of said control signal and said hysterisis signal and second comparison being between said position command signal and said control signal minus said hysterisis signal.

13. A control circuit for a stepping motor having a nonlinear transfer function of current to flux, comprising:
   (a) means for receiving an input signal indicative of the desired direction and rate of motor travel,
   (b) means responsive to said input signal for developing a position command signal which is a sinusoidal waveform modified by the inverse of said transfer function, including a filter circuit for changing said position command signal as a function of said position command signal, and
   (c) means responsive to said position command signal for developing an energization signal for said stepping motor.

* * * * *

UNITED STATES PATENT AND TRADEMARK OFFICE
CERTIFICATE OF CORRECTION

PATENT NO. : 4,100,471
DATED : July 11, 1978
INVENTOR(S) : Pritchard

Figure 2:
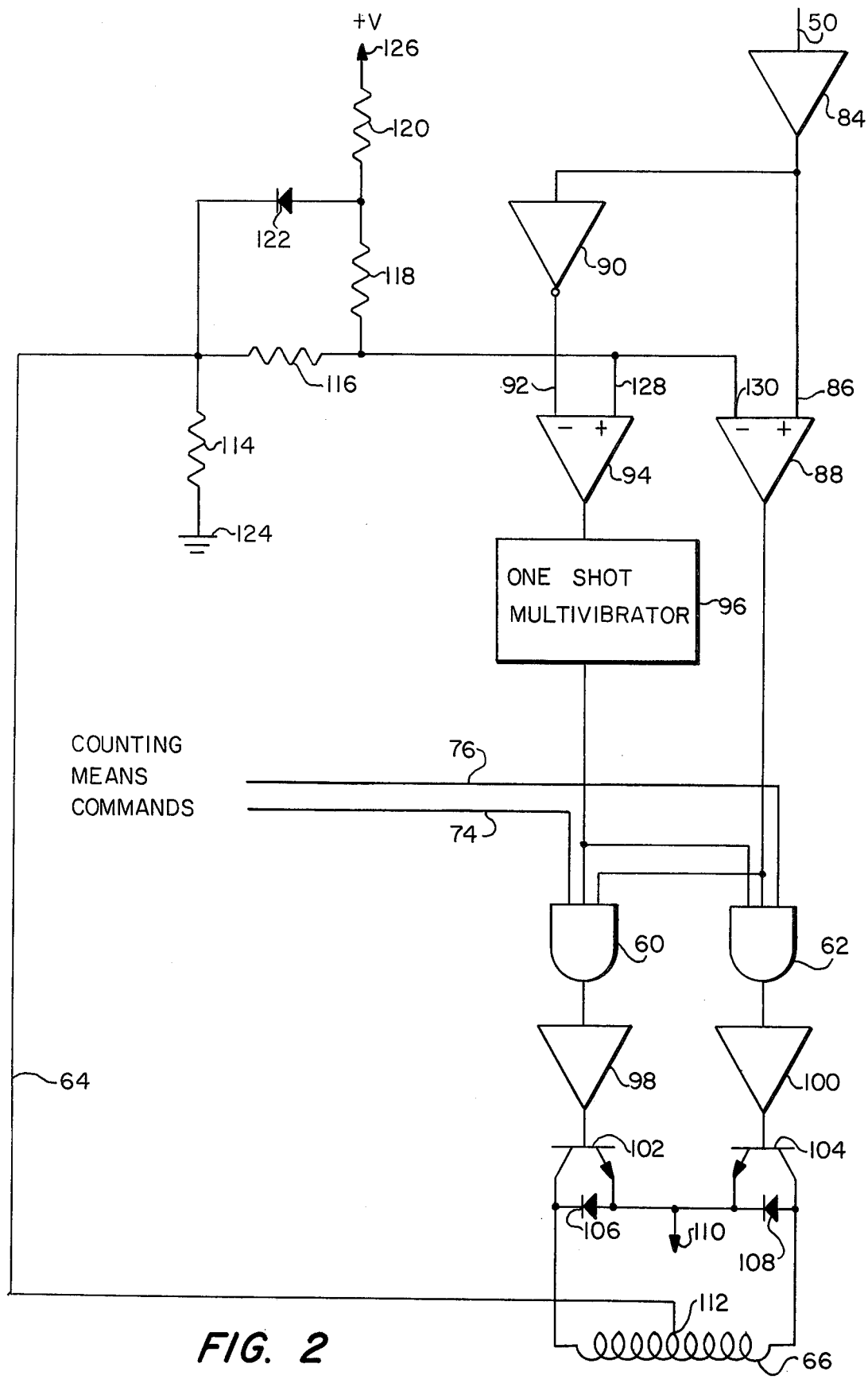
FIG. 2 shows a detailed circuit diagram of a portion of the circuit shown in FIG. 1.

It is certified that error appears in the above—identified patent and that said Letters Patent are hereby corrected as shown below:

In FIG. 2 reverse the orientation of diode 108 to be illustrated as follows:

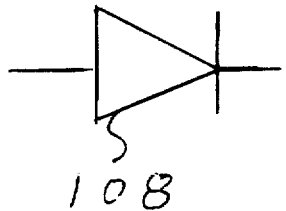
108

Signed and Sealed this

Twelfth Day of June 1979

[SEAL]

Attest:

RUTH C. MASON
Attesting Officer

DONALD W. BANNER
Commissioner of Patents and Trademarks